(12) United States Patent
Rhelimi

(10) Patent No.: US 11,481,523 B2
(45) Date of Patent: Oct. 25, 2022

(54) SECURE ELEMENT

(71) Applicant: GEMALTO SA, Meudon (FR)

(72) Inventor: Alain Rhelimi, Meudon (FR)

(73) Assignee: THALES DIS FRANCE SAS, Meudon (FR)

( * ) Notice: Subject to any disclaimer, the term of this patent is extended or adjusted under 35 U.S.C. 154(b) by 173 days.

(21) Appl. No.: 15/541,000

(22) PCT Filed: Dec. 16, 2015

(86) PCT No.: PCT/EP2015/080104
§ 371 (c)(1),
(2) Date: Jun. 29, 2017

(87) PCT Pub. No.: WO2016/107749
PCT Pub. Date: Jul. 7, 2016

(65) Prior Publication Data
US 2017/0364711 A1 Dec. 21, 2017

(30) Foreign Application Priority Data

Dec. 30, 2014 (EP) ..................................... 14307208

(51) Int. Cl.
*G06F 21/77* (2013.01)
*G06F 21/57* (2013.01)
(Continued)

(52) U.S. Cl.
CPC .............. *G06F 21/77* (2013.01); *G06F 21/44* (2013.01); *G06F 21/575* (2013.01); *G06F 21/71* (2013.01);
(Continued)

(58) Field of Classification Search
CPC ........ G06F 21/77; G06F 21/44; G06F 21/575; G06F 21/71
(Continued)

(56) References Cited

U.S. PATENT DOCUMENTS 6,715,085 B2 3/2004 Foster et al.
7,356,707 B2 4/2008 Foster et al.
(Continued)

FOREIGN PATENT DOCUMENTS

| JP | 2006207089 A | 8/2006 |
| JP | 2014098951 A | 5/2014 |
| WO | 2013190598 A1 | 12/2013 |

OTHER PUBLICATIONS

Koeberl, "TrustLite: A security Architecture for Tiny Embedded Devices", Apr. 16, 2014, ACM, pp. 1-14 (Year: 2014).*
(Continued)

*Primary Examiner* — Kenneth W Chang
*Assistant Examiner* — Gregory A Lane
(74) *Attorney, Agent, or Firm* — The Jansson Firm; Pehr B. Jansson

(57) ABSTRACT

The invention relates to a secure element device comprising at least one processor, at least one communication interface, at least one memory RAM and NVM and at least one bus access controller, wherein the bus access controller defines at least a first area PBL, a second area SBL and a secure area MZ. The first area comprises a first loader program capable of loading a program package in the second area. The secure area comprises an authentication key capable of authenticating the program package loaded in the second area. After authentication of the program package loaded in the second area, the access right of the first loader program is changed in such a way that a program in the first area can no more access the second area.

20 Claims, 5 Drawing Sheets

(51) Int. Cl.
*G06F 21/71* (2013.01)
*G06F 21/44* (2013.01)
*G06F 21/60* (2013.01)

(52) U.S. Cl.
CPC .... *G06F 21/602* (2013.01); *G06F 2221/2143* (2013.01)

(58) Field of Classification Search
USPC .......................................... 713/192
See application file for complete search history.

(56) References Cited

U.S. PATENT DOCUMENTS

| | | | |
|---|---|---|---|
| 7,725,703 | B2 | 5/2010 | Hunter et al. |
| 2005/0010767 | A1* | 1/2005 | Craft ..................... G06F 21/123 713/168 |
| 2006/0294513 | A1* | 12/2006 | Bar-El .................. G06F 21/575 717/120 |
| 2009/0199014 | A1* | 8/2009 | Aralakuppe Ramegowda ............ G06F 11/0796 713/190 |
| 2009/0217047 | A1* | 8/2009 | Akashika ................ G06F 21/33 713/175 |
| 2010/0146304 | A1* | 6/2010 | Miyatake ................ G06F 21/14 713/194 |
| 2010/0235651 | A1* | 9/2010 | Iwamoto ............. H04L 63/0428 713/190 |
| 2011/0004721 | A1* | 1/2011 | Smith ................... G06F 21/575 711/E12.008 |
| 2011/0022832 | A1 | 1/2011 | Motohama |
| 2012/0047499 | A1* | 2/2012 | Krzystofczyk ........... G06F 8/63 717/174 |
| 2012/0079287 | A1* | 3/2012 | Leclercq ............... G06F 21/575 713/192 |
| 2013/0151846 | A1* | 6/2013 | Baumann ............. H04L 9/3263 713/156 |
| 2014/0137271 | A1* | 5/2014 | Hyde .................. G06F 12/0238 726/30 |
| 2014/0245013 | A1* | 8/2014 | Kim ........................ H04L 67/34 713/171 |
| 2015/0121541 | A1* | 4/2015 | Fay .......................... G06F 21/10 726/27 |
| 2015/0161059 | A1* | 6/2015 | Durham .............. G06F 12/1408 713/193 |
| 2015/0207624 | A1* | 7/2015 | Laver .................... H04L 9/0894 713/2 |
| 2015/0207792 | A1* | 7/2015 | Chou .................. H04L 63/0869 726/17 |
| 2016/0147675 | A1* | 5/2016 | Lin ..................... G06F 21/6218 711/164 |

OTHER PUBLICATIONS

Hans-Ulrich Buchmüller: "Security Target Lite, Chip Card & Security", Common Criteria, Dec. 13, 2011, XP055185242, Retrieved from the Internet: URL:http://dfpcorec-p.internal.epo.org/wf/storage/14CE19B1110000204D7/originalPdf [retrieved on Apr. 22, 2015] p. 16-pp. 24, 61; figure 1.

Hans-Ulrich Buchmüller: "Security Target Lite M7892 B11 Including optional Software Libraries RSA-EC-SHA-2—Toolbox Chip Card & Security", Aug. 28, 2012, XP055185236, Retrieved from the Internet: URL:https://www.commoncriteriaportal.org/files/epfiles/0782b_pdf.pdf [retrieved on Apr. 22, 2015] p. 14-p. 38.

Jorge Ferrari et al: "Smart Cards: a case study", Internet Citation, Oct. 1998, pp. 1-233, XP002481135, Retrieved from the Internet: URL:http://www.redbooks.ibm.com/redbooks/pdfs/sg245239.pdf [retrieved on May 21, 2008] Sections 8.1.5 and 9.3.

Rev Nxp: "NXP Secure Smart Card Controller P61N1M3PVD/VE Security Target Lite", Oct. 17, 2013, XP055185309, Retrieved from the Internet: URL:https://www.commoncriteriaportal.org/files/epfiles/0824b_pdf.pdf retrieved on Apr. 23, 2015 Section 2.

Anonymous: "Security IC Platform Protection Profile", Common Criteria, Jun. 15, 2007, XP055185247, Retrieved from the Internet: URL:https://www.commoncriteriaportal.org/files/ppfiles/pp0035b.pdf [retrieved on Apr. 22, 2015] Section 4; figures 1,2.

Guillaume Sauzon: "Time for eGovernment to Muscle up! Fast Forward to Flash", the Vault, May 31, 2012, XP055185225, Retrieved from the Internet: URL:https://silicontrust.files.wordpress.com/2013/05/sn_the_vault_12_20130516_screen.pdf [retrieved on Apr. 22, 2015] the whole document.

PCT/EP2015/080104, International Search Report, dated Jan. 18, 2016, European Patent Office, P.B. 5818 Patentlaan 2 NL—2280 HV Rijswijk.

PCT/EP2015/080104, Written Opinion of the International Searching Authority, dated Jan. 18, 2016, European Patent Office, P.B. 5818 Patentlaan 2 NL—2280 HV Rijswijk.

Code signing, Wikipedia, May 12, 2014. https:en.wikipedia.org/w/index.php?title=Code_signing&oldid=608253846. Downloaded from the internet Dec. 17, 2019.

* cited by examiner

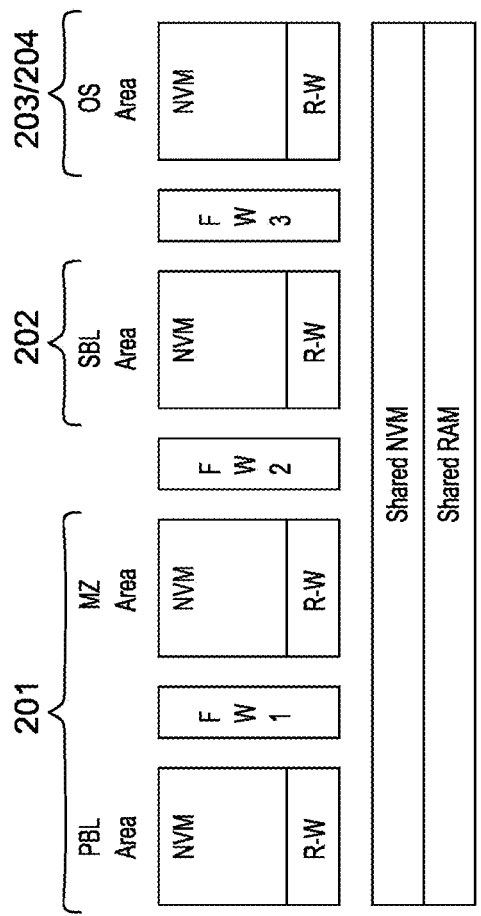

|  |  | Access Allowed From | | | | | | | | | |
|---|---|---|---|---|---|---|---|---|---|---|---|
|  |  | PBL Area | | SBL Area | | MZ Area | | OS Area | | SHARED | |
|  |  | RAM | NVM | RAM | NVM | RAM | NVM | RAM | NVM | RAM | NVM |
| PBL Area | RAM | R | R-W | Denied | Denied |  | R |  | Denied |  | Denied |
|  | NVM | R | R-X | Denied | Denied |  | R |  | Denied |  | Denied |
| SBL Area | RAM | Denied | Denied | R-W-X | R-W-X |  | R | R-W |  |  | Denied |
|  | NVM | Denied | Denied | R | R-W-X |  | R | R |  |  | Denied |
| ML Area | RAM | Denied | Denied | Denied | Denied | R-W-X |  | Denied |  |  | Denied |
|  | NVM |  |  |  |  |  |  |  |  |  |  |
| OS Area | RAM | Denied | Denied | R-W | R-W |  | R | R-W-X |  |  | Denied |
|  | NVM |  |  |  |  |  |  |  |  |  |  |
| Shared | RAM | R-W | R-W | R-W | R-W | R-W |  | R-W |  |  | Denied |
|  | NVM |  |  |  |  |  |  |  |  |  |  |

Fig. 5

| MZ TO | KEYS | | |
|---|---|---|---|
| DOMAINS | $K_{SBL}$ | $K_{OEM}$ | $K_{PBL}$ |
| PBL | Denied | Available | Denied |
| SBL | Available | Denied | Available |
| MZ | Available | Available | Available |
| SHARED | Denied | Denied | Denied |
| SBL RAM | Denied | Denied | Denied |
| PBL RAM | Denied | Denied | Denied |
| OS | Available | Denied | Denied |

Fig. 6

SECURE ELEMENT

BACKGROUND

1. Field of the Invention

The invention relates to a secure element. A secure element is a processing circuit which is tamper resistant.

2. Description of the Related Art

Today secure elements are independent chip that are removable or soldered on a mother board of a biggest electronic device. Commonly a secure element generally comprises a microprocessor with volatile and non volatile memory, frequently a crypto-processor and some hardware circuit dedicated to security. Prior art related to smart card chip constitutes a big part of what is possible in term of security and in term of application of such secure elements.

Nevertheless, the software loaded in the secure element must be secure and securely loaded in the secure element. Commonly, a chip manufacturer can provide blank secure element to a component integrator who will load the secure element with trusted software with a warranty from the component manufacturer that the trusted component is really blank. The component integrator generally loads a secure Operating System (OS) inside the chip. The chip with its OS can then be embedded in a portable card-like device or deliver to another device manufacturer to be included in a bigger electronic device like a smart phone, a computer, a car, a measurement equipment, etc. . . . . .

After the receiving of its OS, a secure element can remotely and securely load applications. The trust of a secure loading is warranted by the component integrator who handles the access key of the secure element. Some problem may occur because the operating system must be adapted to receive the final application. Another problem is that the final client of the electronic device cannot choose the component integrator who is the warrant of the security of its application.

Ideally, it will be the best that secure element will be integrated completely blank into the electronic device in such a way that a full customization can be done after the buying of the electronic device. But the main problem is how to warrant to the final client that the secure element is really blank, in particular after many reselling of the electronic device.

SUMMARY OF THE INVENTION

The invention proposes a new structure of embedded circuit that comprises some hardware features for warranting that the component is really blank. More particularly the invention is a secure element that comprises at least one processor, at least one communication interface, at least one memory and at least one bus access controller. The bus access controller defines at least a first area, a second area and a secure area. The first area comprises a first loader program capable of loading a program package in the second area. The secure area comprises an authentication key capable of authenticating the program package loaded in the second area. After authentication of the program package loaded in the second area, the access right of the first loader program is changed in such a way that a program in the first area can no more access the second area.

The use of the first loader program with access rights that are changed after the loading of the program warrant cuts a possible way of attack through the first loader.

Preferentially, the program package loaded in the second area may comprise an authentication token including a signature of the loaded program package that can be authenticated with the authentication key. The loaded program package may contain a second key that is encrypted with the authentication key, the second key being used for decrypting at least one part of the program package.

The program package loaded in the second area may comprise a second loader program. This second loader package being made by the OS maker, the control on this second loader is more reliable and enables to use more complex mechanism of protection well know in the art when all the environment is under control. A subsequent loading made by the second loader program may be made in an encrypted manner, the decrypting being made using the second key.

An increasing of security can be made by additional hardware firewalling. The bus access controller may define a third area that can be loaded only by the second loader program, for example dedicated to the operating system. Another security improvement may consist in the storing of the second key in the secure area. The bus access controller may define a neutral area that can be accessed in read and write mode from any program running in another area, said neutral area being used for passing data between areas, and wherein, in case of detection of an access right violation by the bus access controller, all data in the neutral area are erased. The secure area may comprise some secure functions of encryption and decryption that can be launched from another area but their execution is made in the secure area only.

For a reuse purpose, after a completed erasing of the second area, the first loader program may access again the second area. Such a mechanism can allow the reuse of the chip without risk of disclosure of confidential data because they are erased. In that case, if there is a third area, the third area should be erased simultaneously with the second area. For preventing accidental erasing, the erasing of the second area should be made only after an authentication for erasing from a host device connected to the communication interface.

BRIEF DESCRIPTION OF THE DRAWINGS

The invention will be described with more details with reference to the annexed drawings in which:

FIG. 3 shows a memory map defined by the security domains according the invention, FIGS. 4 and 5 show access tables of the memories according to their security domain, FIG. 6 shows a table of key management.

DETAILED DESCRIPTION

Figure 1:
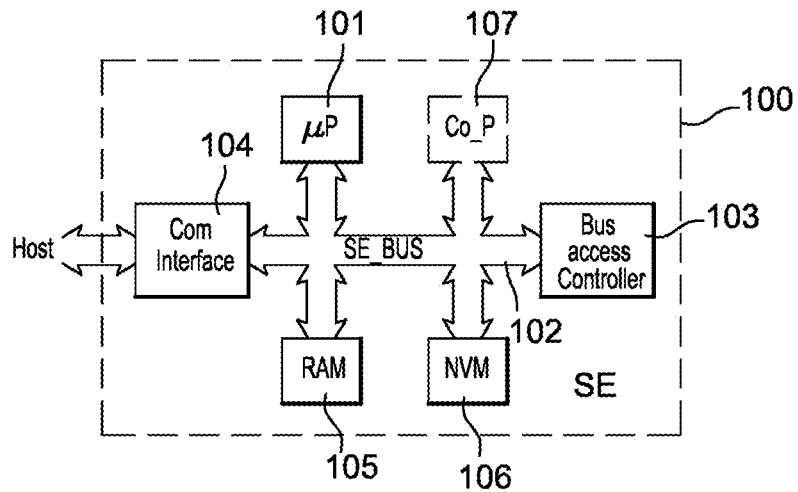
FIG. 1 shows a block diagram of a secure element.

FIG. 1 shows an example of architecture of secure element 100 that comprises a processing unit 101 connected to a central bus 102 monitored by a bus access controller 103. The central bus is also connected to a communication interface 104, a volatile memory (RAM) 105, a Non Volatile Memory 106 and a crypto coprocessor 107. Other architecture of secure element can be adapted for the invention. Such a secure element 100 is made in integrated circuit. But taking into consideration that the secure element will be software configured it can be seen as a piece of chip. In other world, the secure element can be integrated inside a system on chip in which the secure element is a module communicating through its communication interface 104.

For a secure element 100 embedded inside a System On Chip, the communication interface 104 can be a parallel interface connected to the central bus of the SOC. In that case the host of the secure element 100 is the SOC. The communication interface 104 will mainly comprise a buffer for receiving commands and data from the host.

If the secure element 100 is made to be alone inside an integrated circuit, the communication interface 104 may include one or more interface according one or more well known protocol. Preferentially, a serial interface is used, like ISO7816, ISO, USB, I2C, SPI, SWP or any serial interface commonly used for communication between two chips. It is also possible to have a contactless interface to couple directly an antenna to the chip like: ISO14443, Zigbee, Bluetooth or any other.

The crypto coprocessor 107 is implemented for making computing some operation dedicated to cryptography faster than the processing unit 101. Even if the use of a crypto coprocessor 107 is not necessary, it is recommended to have one for performing strong cryptographic function that could take a long processing time on a general purpose processor like the processing unit 101.

The non volatile memory 106 can comprise several type of memory like ROM, PROM, E2PROM, or Flash E2PROM. Typically a part of the memory is programmed only once and can be programmed directly by the IC manufacturer. All kind of data and program that are provided by the IC manufacturer can use a technology that is not erasable. The volatile memory 105 and the non volatile memory 106 is arranged to be separable in different area that are easily identifiable by their address.

The central bus 102 is a parallel microprocessor bus that comprises three parts, one part for the address, one part for the data and a last part for the control signals. The bus access controller 103 monitors the address and the control signals of the central bus 102. An address map is defined by hardware for separating the memory in several areas, each areas corresponding to a security domain that will be detailed later. The control signals enable the bus access controller to know if the memory access is a Read, a Write or a Fetch operation. Considering that a Fetch is for executing an instruction, the access bus controller knows from which address the next access will be done. Preferentially, the bus controller 103 is hard wired in such a way that it is not possible to modify the monitored address mapping of the secure element 100. The bus access controller 103 comprises at least one bit of a non volatile type that can be programmed for changing one access rule. The man of the art can easily make such a bus access controller depending of the rules to implement that will be detailed.

Figure 2:
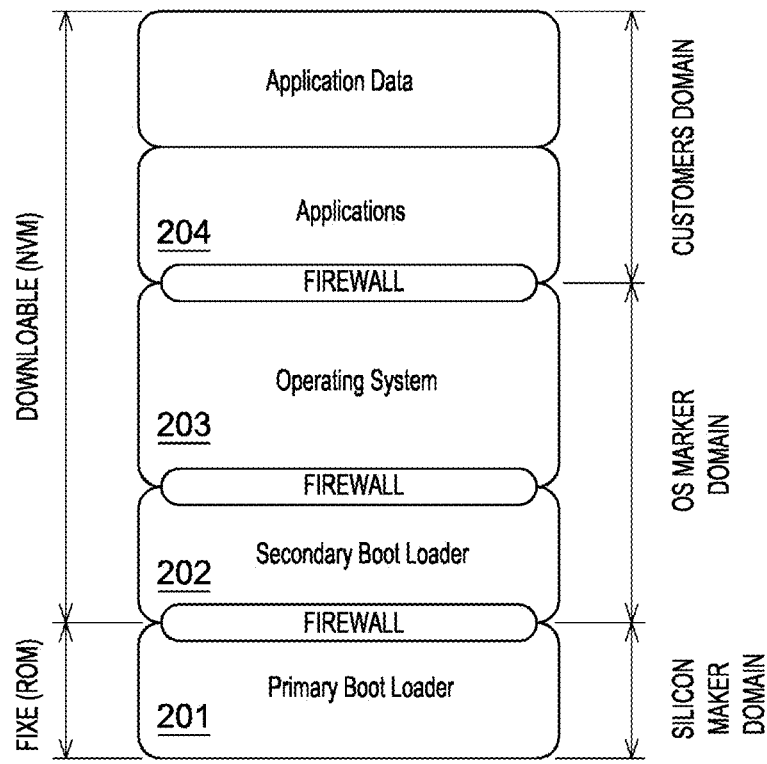
FIG. 2 shows the security domains of the secure element according the invention.

The FIG. 2 shows the different security domains that could be implemented with the invention. A first domain 201 is the domain of the IC manufacturer. The first domain 201 principally contains a primary boot loader that will be used for securely loading the subsequent software. A second domain 202 is under the control of the OS maker. The second domain 202 contains a secondary boot loader. The secondary boot loader being loaded by the primary boot loader and will be used for loading the Operating System. A third domain 203 is under the control of the OS maker. The third domain contains the Operating System. A fourth domain is dedicated to the customers and contains the application. All the domains are separated by firewalls in such a way that software of one domain cannot access the data of the other domain.

In a preferred implementation of the invention the firewalls between the first and second domains and between the second and third domains are hardware firewalls while the firewall between the third and the fourth domains is made by software of the OS. In a variant, the second domain and the third domain could also constitute a single domain without firewall. The hardware firewall between the first and second domains warrants the secrecy between the IC manufacturer and the OS maker.

The FIG. 3 details the memory map corresponding to the different domains for explaining how ensuring the hardware security. In the FIG. 3, the first domain 201 is shared in two memory areas, one dedicated to the primary boot loader (PBL area) and another one for the security functions (MZ area). The MZ area comprises security functions and cannot be accessed from the PBL area. The second domain 202 contains the secondary boot loader and constitutes the SBL area. The second and third domains 203 and 204 are placed in a single area (OS area). This four areas (PBL area, MZ area, SBL area and OS area) area separated from each other by hardware firewalls FW1, FW2 and FW3 managed by the bus access controller 103. A fifth area corresponds to a shared area open in writing and reading for all area. The shared area is used for enabling to securely exchange information between the separated areas.

The specific hardware firewalling of the areas aims to prevent any leaks of the secrets between a Primary Boot Loader and Secondary Boot Loader enforcing natively the firewalling between the first and the second domains. Even if the PBL has a software dysfunction or a malicious program has been inserted then the certified hardware will prevent any leaks of secrets outside the counterpart domains. In summary the PBL cannot disclose secrets of the SBL and vice and versa.

For more details on the access rules of the bus access controller, reference is made to FIGS. 4 and 5. FIG. 4 corresponds to the access rules before the loading of the secondary boot loader and FIG. 5 corresponds to the access rules after the loading and authentication of the secondary boot loader. These FIGS. 4 and 5 are implemented by hard wiring in the bus access controller in such a way that the rules are sealed for the life of the component. As indicated before the bus access controller 103 monitors the bus and the processed instruction. At any time the bus access controller 103 knows the area from which is the current executed instruction. Depending of the originated area, some right are given on the other area. In the table a R indicates that access rights are allowed for reading operation, a W indicates that access rights are allowed for writing operation and a X indicated that a fetch operation is allowed in view of a future execution.

As it can be seen the rights defined the FIGS. 4 and 5 allow execution of instruction only in its area. The only one difference between the two figures is the access rights from the PBL area to the SBL area. On FIG. 4, the PBL area has the right to access in Read and Write the SBL area for downloading a program package in the SBL area and verifying that the loading is performed. After the downloading of the package an authentication of the package will be done and is successful, the non volatile bit of the bus access controller changes and the access from the PBL area to the SBL area is then prohibited as indicated in the FIG. 5.

Such a memory mapping can be modified by the man of the art depending of the level of security and of some choice. In the example of the specification, OS area is separated from the SBL area. The SBL area has access rights in the OS area in Read and Write because all updates of the OS should be made through the secondary boot loader. Regarding the OS area some access rights are also given for the SBL area, in particular for using some information from the SBL area that could be of interest for loading software application. Considering that the two corresponding domains could be a same domain, it is also possible to define a single area for both the SBL area and the OS area. This is possible because the secondary boot loader is made by the OS maker for warranting to the OS maker that the operating system is securely loaded by the boot loader software completely identified. The firewalling between the operating system and the secondary boot loader could be made by software.

As it can be seen, some data can be passed from one area to another one through the shared area. With such a mechanism, only data are normally transferred from one area to another one. In addition, the area receiving the data has the full control on the received data because it is normally read by a program of said area. Nevertheless, if the bus access controller 103 detects a right violation, or if a fault of the processing unit is detected then the shared memory is completely erased. Optionally, the secure element 100 may comprises some security sensors for detection of physical attacks according to what is already known for such secure component. If the security sensors detect a potential attack, the shared memory is also erased.

For switching from one area to another area, two mechanisms are possible. A first mechanism is to load a pointer corresponding to the launching of a function with eventually some data in the shared memory and then to activate an interruption indicating a switch to a selected area. The activation of the area can then read the pointer and the eventual data. After the reading a verification of the pointer is made in the area for launching the pointed function.

Another mechanism is to define one or more entry point in each area. These entry points can correspond to specific addresses that are identified by the bus access controller to be authorized exception to the general access rules. Of course complementary data should be passed through the shared memory.

As introduced before, the MZ area contains the security function of the chip. The MZ area contains the code of one or more cryptographic functions together with the keys that will be used by the secure elements. In the same way, the crypto coprocessor runs normally only in the MZ domains. Some other functions are also dedicated to the MZ domain like the authentication of the code loaded in the SBL domain, the erasing of the SBL area, the locking and unlocking of the non volatile bit of the bus access controller. The MZ area is completely under the control of the IC manufacturer and it should be a certified domain that is certify with its software. Part of the non volatile memory can be a ROM type because the code is not to be modified. Alternatively, some function contained into the MZ may launch some hard wired state machine acting in place of the processing unit for performing some functions.

All crypto processing being made inside the MZ area, The MZ area stores all keys together with a table of access rights. As an example, FIG. 6 shows a table with three keys that are the keys to be used during the installation process that is to be detailed now. A first key $K_{PBL}$ is the key assigned to the primary boot loader for authenticating that the program package loaded has the right to be loaded, for authenticating that the PBL area has not been modify and also for decrypting a second key $K_{SBL}$ which is the key for encrypting the secondary boot loader. Preferentially, a third key $K_{OEM}$ is used for the launching some function like the memory erasing. The first key and the third key are separated key in such a way to authorize a separation of the management for two different functions that possibly use two different algorithms, these two keys $K_{PBL}$ and $K_{oem}$ are loaded directly by the IC manufacturer. In a variant, it is possible to have a single key in place of the first and third keys.

As indicated in FIG. 6, keys are available for some domains and not for some others. Considering that all crypto-processing is made inside the MZ area, the key always remains in the MZ area but they can be use only is the processing is launched from an authorized area. In any case, a key registered inside the MZ area never goes outside the MZ area and all use of a key must be performed inside the MZ area. The first key $K_{PBL}$ is available on a processing requested from SBL area or from MZ area but this first key $K_{PBL}$ cannot be used if the request comes from another area. The second key $K_{SBL}$ is available for SBL area, MZ area and OS area and not for other areas. The third key $K_{OEM}$ is available for PBL area and MZ area.

Figure 7:
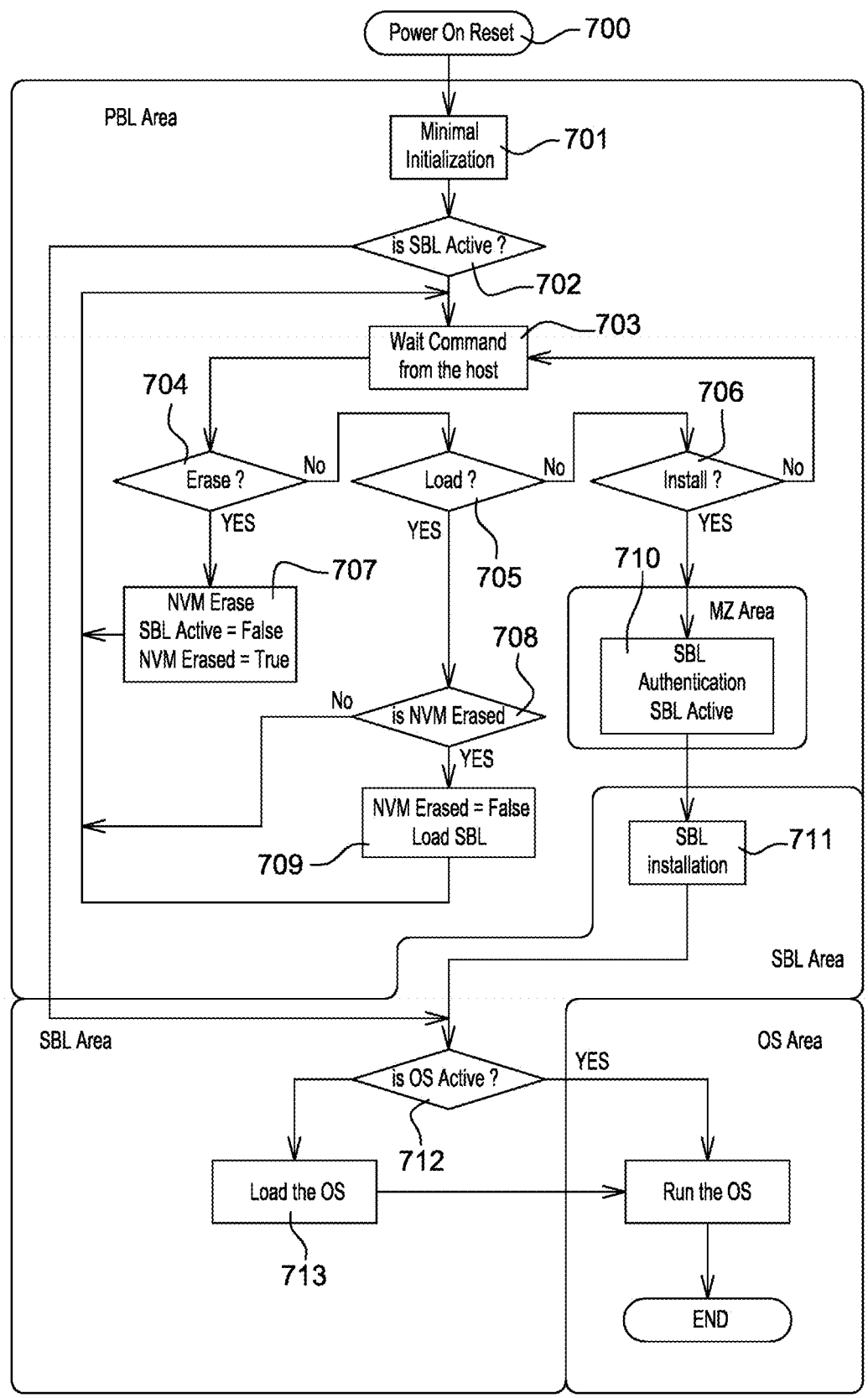
FIG. 7 is a flow chart of installation of the secondary boot loader.

The installation process is described in reference to the algorithm of FIG. 7. The process starts once the secure element is powered on step 700. When the voltage is considered to be at the operating level a step 701 of initialization is performed. This step is mainly a reset of all buffer of the component and a positioning of the program pointer in the PBL area on an instruction corresponding to test 702. Test 702 consists in verifying a flag in the non volatile memory that indicates is the Secondary Boot Loader is active or not. If the SBL is not active then the secure element 100 is put in a waiting state 703. The waiting state is an idle state in which an interruption from the communication interface 104 indicates the reception of a command allowing going to the next step which is the test 704. The test 704 verifies if the received command is an Erase command. If the command is not an erase command then test 705 verifies if it is a Load command. If the command is not a Load command, then a test 706 verifies if it is an Install command. If the command is not an install command, then the process go back in the idle step 703 till the next command reception.

The man of the art can note that the Primary Boot Loader only react to only three command coming from the host. The three commands are the minimum set of command that is necessary for loading a program. It is essential that the PBL is of the smallest possible size with the smallest number of commands for reducing the potential risk of attack.

If the received command is an Erase command, then an erasing step 707 is performed. During this erasing step 707, the PBL will verify an authentication token. As an example, the authentication token may comprise a random number and said random number encrypted with the third key $K_{OEM}$. The encryption method can be for example an AES algorithm. The PBL area will temporarily requests the MZ area either the computation of an AES of the number using the third key $K_{OEM}$ or the decryption of the encrypted number. The result will then be compared with the other part of the token. If the token is authenticated, then all the non volatile memory of the SBL area and of the OS area is erased. For finalizing the step 707, two non volatile flags are rewritten, one indicating that the SBL is not active and another indicating that the non volatile memory is erased. Then the process can go back to the idle step 703.

If the received command is a Load command, then a test 708 is performed. The test 708 only verifies the status of the flag indicating if the memory is correctly erased or not. If the memory is not correctly erased then the process returns to idle step 703. If the memory is erased, then it starts a loading step 709 in which the non volatile flag indicating that the memory is no more erased and wherein the loading of a program package coming from the communication interface is loaded in the SBL area. The man of the art can note that the PBL area can access the SBL area during this step 709 because the SBL is not active.

The program package comprises the encrypted code of the SBL, an authentication token and the second key $K_{SBL}$. There are many alternatives for making such a program package and only one example will be mainly detailed. The encrypted code is for example encrypted according an AES algorithm using the second key $K_{SBL}$. Regarding the authentication token, it is important to define a token that can enable to verify the code integrity and also that the code is allowed to be loaded. For encrypting the second key $K_{OEM}$, we should also use the first key $K_{PBL}$ but the OS manufacturer must not know the key $K_{PBL}$. For allowing such a mechanism, the IC manufacturer must provide an identification information constituted of a couple of two information, one information being a number $R_{PBL}$ and the other is an encrypted number $C_{PBL}$ corresponding to the encryption of $R_{PBL}$ with an AES algorithm using the first key $K_{PBL}$. One manner to encrypt the second key $K_{SBL}$ is to make a cryptogram using the information $R_{PBL}$, information $C_{PBL}$ being passed into the package. Then a signature of the package can be made making a hashing function of the entire package together with information $R_{PBL}$ replacing $C_{PBL}$.

For clarifying the example with formula, the IC manufacturer gives to the OS manufacturer the couple of information:

$\{C_{PBL}; R_{PBL}\}$

Wherein:

$C_{PBL}=AES[K_{PBL}](R_{PBL})$ $R_{PBL}=AES^{-1}[K_{PBL}](C_{PBL})$

The package corresponds to the following group of information:

$\{EC; C_{PBL}; CK_{SBL}; X_{SBL}\}$

Wherein:

EC is the encrypted code:

$EC=AES[K_{SBL}](code)$ $CK_{SBL}$ is the cryptogram of the second key $K_{SBL}$:

$CK_{SBL}=K_{SBL} XOR R_{PBL}$ $X_{SBL}$ is the signature of the package $X_{SBL}=SHA256(EC;R_{PBL};CK_{SBL})$ SHA256 being a secure hash value on 256 bits well known by the man of the art.

The authentication token in that case is the couple $\{C_{PBL}; X_{SBL}\}$ transmitted inside the package.

Of course other encoding possibility can be done. It is possible to use Public Key Infrastructure with RSA instead of symmetric key an AES. The importance is to be capable to authenticate the code and encrypt the second key $K_{SBL}$ using the first key $K_{PBL}$ without giving the key $K_{PBL}$ to the OS manufacturer.

After the disclosure of the program package loaded in the SBL area, it will become easier to continue to disclose the process of FIG. 7. On the reception of an Install command, the Primary Boot Loader launches an authentication step 710 that is executed by the MZ area. The authentication step 710 aims to check the integrity and the authentication of the package but it also has to verify the integrity of the PBL area, to lock the PBL area access on the SBL area and finally decrypt the code.

Taking into consideration the couple of information $\{C_{PBL}; R_{PBL}\}$ and the package $\{EC; C_{PBL}; CK_{SBL}; X_{SBL}\}$, the MZ area reads $C_{PBL}$ for computing $R_{PBL}$ using $K_{PBL}$. Then the signature is computed for verifying that the signature $X_{SBL}$ is correct. If the signature $X_{SBL}$ is not correct, then a message of error is sent to the communication interface 104 and the memories of SBL area and of OS area are erased. If the signature $X_{SBL}$ is correct that means the package is authenticated and then the non volatile flag indicating that the SBL is authenticated is set from preventing access from PBL area into SBL area. Before decrypting the code a verification of the integrity of the PBL area is also check for example using by performing a SHA256 on all the PBL area, and then a comparison is made with a signature previously recorded in the MZ area. Being sure of the component integrity, the second key $K_{SBL}$ is extracted from $CK_{SBL}$ and stored in the MZ area.

Finally, the MZ switches to the SBL area for a decryption step 711 in which the code is decrypted using the second key $K_{SBL}$.

The SBL being active, the process continue to run in a test 712 that verify if an operating system is install or not. The Secondary Boot Loader code function is mainly to provide a secure boot loader for the operating system. So if the OS is not load, then a loading step 713 is performed for loading the OS in the OS area. The loading of the OS can be more complex and it is also possible to define software firewall for the applications because the OS installation by the secondary boot loader is made and warranted by the OS maker. The fact that the OS can be load only by the Secondary Boot Loader makes the loading of OS more secure. In particular, the same key $K_{SBL}$ can be also used for decrypting the package of the Operating System. After the loading of the OS, the OS becomes active and it is possible to run the OS and the installed application.

One additional advantage of the invention is that a device including the secure element of the invention can implement different application that can come from different sources and that do not necessarily use the same OS. In that case, an encrypted backup of the application, of the OS and of the boot loader can be done on the host and the memory can be completely erased for receiving another secondary boot loader with its OS and its applications.

Man of the art will understood that the example of embodiment can be modified without changing the scope of the invention as defined in the annexed set of claims.

The invention claimed is:

1. A secure element device, comprising:
at least one processor;
at least one communication interface;
at least one memory; and
at least one bus access controller, wherein the bus access controller defines at least a first area, a second area and a secure area in the at least one memory, wherein:
the first area having access rights allowing a first loader program, stored in the first area and capable of loading a program package into the second area, to load the program package into the second area,
the secure area comprises a secret authentication key solely accessible from within the secure area, exclusively for authentication initiated from the second area, and capable of authenticating the program package loaded in the second area, after successful authentication of the program package loaded in the second area, the access right of the first area is permanently changed in such a way that a program in the first area can never again load into the second area.

2. The secure element device of claim 1, wherein the program package loaded in the second area comprises an authentication token including a signature of the loaded program package that can be authenticated with the authentication key.

3. The secure element device of claim 1, wherein the loaded program package contains a second key that is encrypted with the authentication key, the second key being used for decrypting at least one part of the program package.

4. The secure element device of claim 1, wherein the program package loaded in the second area comprises a second loader program.

5. The secure element device of claim 4, wherein the bus access controller defines a third area that can be loaded only by the second loader program.

6. The secure element device according claim 3, wherein a subsequent loading made by the second loader program is made in an encrypted manner, the decrypting being made using the second key.

7. The secure element device of claim 3, wherein the second key is stored in the secure area.

8. The secure element device of claim 1, wherein the bus access controller defines a neutral area that can be accessed in read and write mode from any program running in another area, said neutral area being used for passing data between areas, and wherein in case of detection of an access right violation by the bus access controller, all data in the neutral area are erased.

9. The secure element device of claim 1, wherein the secure area comprises secure function of encryption and decryption that can be launched from another area but their execution is made in the secure area only.

10. The secure element device of claim 1, wherein after a completed erasing of the second area, the first loader program can access again the second area.

11. The secure element device of claim 5, wherein the third area is erased simultaneously with the second area.

12. The secure element device of claim 10, wherein the erasing of the second area can be made only after an authentication for erasing from a host device connected to the communication interface.

13. An integrated circuit comprising: a secure element device, having:
- at least one processor;
- at least one communication interface;
- at least one memory; and
- at least one bus access controller, wherein the bus access controller defines at least a first area, a second area, and a secure area in the at least one memory, wherein:
  - the first area having access rights allowing a first loader program, stored in the first area and capable of loading a program package into the second area, to load the program package into the second area,
  - the secure area comprises a secret authentication key solely accessible from within the secure area, exclusively for authentication initiated from the second area, and capable of authenticating the program package loaded in the second area,
  - after successful authentication of the program package loaded in the second area, the access right of the first area is permanently changed in such a way that a program in the first area can never again load into the second area.

14. The integrated circuit of claim 13, wherein the integrated circuit is a System On Chip comprising several circuits and wherein the secure element device is one of the circuits.

15. The integrated circuit of claim 13, wherein the program package loaded in the second area comprises an authentication token including a signature of the loaded program package that can be authenticated with the authentication key.

16. The integrated circuit of claim 13, wherein the loaded program package contains a second key that is encrypted with the authentication key, the second key being used for decrypting at least one part of the program package.

17. The integrated circuit of claim 13, wherein the program package loaded in the second area comprises a second loader program.

18. The integrated circuit of claim 17, wherein the bus access controller defines a third area that can be loaded only by the second loader program.

19. The integrated circuit of claim 16, wherein a subsequent loading made by the second loader program is made in an encrypted manner, the decrypting being made using the second key.

20. The integrated circuit claim 17, wherein the second key is stored in the secure area.

* * * * *